Jan. 1, 1924.

W. MERTÉ

PHOTOGRAPHIC LENS

Filed Aug. 13, 1921

1,479,197

Inventor:
Willy Merté

Patented Jan. 1, 1924.

1,479,197

UNITED STATES PATENT OFFICE.

WILLY MERTÉ, OF JENA, GERMANY, ASSIGNOR TO THE FIRM OF CARL ZEISS, OF JENA, GERMANY.

PHOTOGRAPHIC LENS.

Application filed August 13, 1921. Serial No. 492,121.

(GRANTED UNDER THE PROVISIONS OF THE ACT OF MARCH 3, 1921, 41 STAT. L., 1313.)

*To all whom it may concern:*

Be it known that I, WILLY MERTÉ, a citizen of the German Empire, residing at Jena, Germany, have invented a new and useful Photographic Lens (for which I have filed an application in Germany, March 22, 1919; France, July 9, 1920, Patent No. 519980; and Italy, July 8, 1920), of which the following is a specification.

The present invention relates to a photographic lens, which consists of four members cemented together. In the new kind of this type of lens provided by the present invention each of the five limiting surfaces, with the exception of the one lying middlemost and the one next to it (from the diaphragm), turns its concave side towards the diaphragm, the outer surface facing the diaphragm and the middlemost cemented surface each having a slighter curvature than the respective following cemented surface, and the refractive index increasing from the diaphragm. The said construction of the new lens affords the possibility of rendering the lens serviceable for a comparatively large aperture ratio, the chromatic aberrations being corrected in a sufficient measure, and, moreover, of correcting in a high degree the astigmatism and the curvature of the image-field over an extraordinarily large field.

Figure 1:
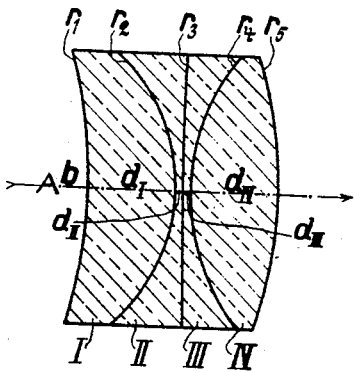
Figure 2:
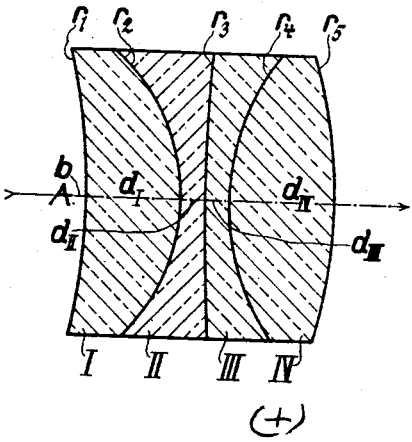

In each of the Figs. 1 and 2 of the drawing a constructional example of the invention is shown.

The following tables contain the essential values, the dimensions applying to the focal length 100. The diaphragm is to be located in the plane crossing the axis in the point marked A.

*Table respecting Fig. 1.*

$r_1 = -19.9$      $b = 1.6$
$r_2 = - 7.4$      $d_I = 3.7$
$r_3 = +83.4$      $d_{II} = 0.3$
$r_4 = + 8.8$      $d_{III} = 0.3$
$r_5 = -17.5$      $d_{IV} = 3.7$

|  | I. | II. | III. | IV. |
|---|---|---|---|---|
| $n_D =$ | 1.4600 | 1.5200 | 1.6090 | 1.6142 |
| $\nu =$ | 66.7 | 63.6 | 49.1 | 58.5 |

The lens may suitably be used up to an aperture ratio of 1:10. A double lens composed of two identical lenses is suitable up to an aperture ratio of 1:5.

*Table respecting Fig. 2.*

$r_1 = - 24.7$      $b = 0.8$
$r_2 = - 7.8$       $d_I = 3.9$
$r_3 = +104.0$      $d_{II} = 1.0$
$r_4 = + 9.6$       $d_{III} = 1.0$
$r_5 = - 20.0$      $d_{IV} = 4.4$

|  | I. | II. | III. | IV. |
|---|---|---|---|---|
| $n_D =$ | 1.47816 | 1.53305 | 1.6128 | 1.621 |
| $\nu =$ | 65.9 | 55.4 | 54.6 | 57.5 |

The lens may suitably be used up to an aperture ratio of 1:9. A double lens composed of two identical lenses is suitable up to an aperture ratio of 1:4.5.

I claim:

1. In a photographic lens four members cemented together, each of the five boundary surfaces, except the middlemost and the one which (from the diaphragm) follows it, turning its concave side towards the diaphragm, the outer surface facing the diaphragm and the middlemost cemented surface each having a slighter curvature than the respective following cemented surface and the refractive index increasing from the diaphragm through the whole lens.

2. In a photographic objective two lenses in each of which each of the five boundary surfaces, except the middlemost and the one which (from the diaphragm) follows it, turning its concave side towards the diaphragm, the outer surface facing the diaphragm and the middlemost cemented surface each having a slighter curvature than the respective following cemented surface and the refractive index increasing from the diaphragm through the whole lens.

WILLY MERTÉ.

Witnesses:
  PAUL KRÜGER,
  RICHARD HAHN.